United States Patent Office 3,659,026
Patented Apr. 25, 1972

1

3,659,026

MIXTURE OF XANTHOMONAS HYDROPHYLIC COLLOID AND LOCUST BEAN GUM AS AGRICULTURAL CARRIER

Harry R. Schuppner, Jr., El Cajon, Calif., assignor to Kelso Company, San Diego, Calif.

No Drawing. Continuation-in-part of application Ser. No. 502,624, Oct. 22, 1965. This application Dec. 8, 1969, Ser. No. 883,229
The portion of the term of the patent subsequent to Apr. 21, 1987, has been disclaimed
Int. Cl. A01n *17/08*
U.S. Cl. 424—361 29 Claims

ABSTRACT OF THE DISCLOSURE

A method of improving the application of agricultural chemicals embodied in an aqueous carrier by admixing therewith from about 0.10% to about 2% by weight of the aqueous component of the carrier of a mixture of a Xanthomonas colloid and locust bean gum at weight ratios of Xanthomonas colloid to locust bean gum ranging from 95:5 to 5:95. A composition comprising an agricultural chemical, an aqueous carrier for the agricultural chemical, and from about 0.10% to about 2% by weight of the aqueous component of the carrier of a mixture of a Xanthomonas hydrophilic colloid and locut bean gum with the weight ratio of the Xanthomonas hydrophilic colloid to locust bean gum ranging from 95:5 to 5:95.

This application is a continuation-in-part of my earlier copending application Ser. No. 502,624, filed Oct. 22, 1965, and now abandoned.

This invention relates to a new and useful method of applying agricultural chemicals.

Horticulturalists are regularly concerned with protecting or controlling the growth of plants. To accomplish such a purpose they spray coat plants with agricultural chemicals such as pesticides, fungicides, growth modifiers to promote growth of plants, or herbicides to kill undesired plant life commonly known as weeds. Other agricultural chemicals are used to kill insects and pests such as flies, mosquitos, mites, ticks, weevils, termites, lice and nematodes. In the following and in the appended claims the words "agricultural chemicals" are intended to include all of the foregoing.

Agricultural chemicals are commonly applied in water solutions, suspensions, or emulsions in treating plant life. Said applications are made to root, stem, foliage, fruit, or flower depending upon the object to be accomplished by the particular treatment. To be effective, the treating materials must remain in contact with the plant life to which they are applied. In addition, it is usually very undesirable for these treating materials to drift onto neighboring areas. For example, it is common to spray such treating materials to the planted areas along highways, freeways, and the like. If the active ingredient in the spray drains from the growth, much of it is wasted and its effectiveness dissipated. At the same time if the spray, for example, is a herbicide and it drifts onto neighboring farmland it can destroy valuable crops. Similarly, the effectiveness of agricultural chemicals when applied to pests or animals or other objects is increased when the chemicals adhere to the animal or object being treated.

It is an object of my invention to provide a new and useful method of applying agricultural chemicals.

It is a further object of my invention to provide a method of increasing the adherence of agricultural chemicals to plants, animals and surfaces treated therewith.

2

It is still another object of my invention to provide a method of applying treating materials to plant life that is capable of confining the applied treating materials to plants in a given area.

Another object of my invention is to provide a novel agricultural chemical composition having increased adherence to plants, animals and surfaces treated therewith.

It is still an additional object of my invention to increase the efficiency of the application of agricultural chemicals.

In accord with my invention I have surprisingly found that one or more of the foregoing objectives may be obtained by incorporating in an aqueous carrier for agricultural chemicals a relatively small amount of a Xanthomonas hydrophilic colloid in admixture with locust bean gum. The total quantity of the Xanthomonas hydrophilic colloid in admixture with locust bean gum is in the range of about 0.10% to about 2% by weight of the aqueous component of said carrier. Amounts in the range of 0.2% to 1% by weight and more preferably about 0.80% of the aqueous component are preferred.

Utilizing a mixture of a Xanthomonas hydrophilic colloid with locust bean gum, I have found that the two components produce a synergistic effect in terms of the increase in viscosity of the aqueous agricultural chemical composition. A synergistic effect in terms of increased viscosity is observed over a wide range from about 95 parts by weight of a Xanthomonas hydrophilic colloid to about 5 parts by weight of locust bean gum to about 5 parts by weight of a Xanthomonas hydrophilic colloid for about 95 parts of locust bean gum. A preferred range is from 80% Xanthomonas hydrophilic colloid—20% locust bean gum to 20% Xanthomonas hydrophilic colloid—80% locust bean gum since the synergistic effect produced within this range is greater than at concentrations outside the range. A most preferred concentration range comprises about 40 parts by weight of a Xanthomonas hydrophilic colloid for each 60 parts of locust bean gum since the greatest viscosity increase has been observed at weight ratios of this order.

A preferred way of employing a mixture of a Xanthomonas hydrophilic colloid with locust bean gum according to my invention uses a single aqueous solution containing a Xanthomonas hydrophilic colloid, with locust bean gum, and an appropriate agricultural chemical or chemicals. In this instance, some viscosity increase will be noted upon addition of the locust bean gum and the Xanthomonas hydrophilic colloid to the aqueous medium. However, the viscosity increase is not sufficient to inhibit the use of the aqueous medium as an agricultural chemical since it can still be pumped and sprayed through a nozzle.

A further method of using my process employs at least two aqueous solutions or mixtures, one of which contains the Xanthomonas hydrophilic colloid and another of which contains locust bean gum. The agricultural chemical may be added to either or both of these solutions or mixtures which are then mixed in a mixing nozzle in a manner well known to the art. On mixing of the two solutions, they are subjected to high shear forces which assist in the viscosity increase of the mixture. Although the amount of shear produced in the mixing nozzle is a factor in determining the amount of viscosity increase produced through admixture of the two solutions, this is not a variable which is critical to my invention. Since the viscosity of the resulting mixture is dependent upon both the amount of shear involved in the mixing step and also on the respective quantities of the Xanthomonas hydrophilic colloid and locust bean gum, the two factors can be varied with respect to each other by the operator to produce whatever result is desired. Thus, if a nozzle is employed which produces a relatively low degree of shear during mixing, the relative quantities of Xanthomonas hydrophilic colloid and locust bean gum can be varied or the total quantity of Xanthomonas hydrophilic colloid and locust bean gum can be increased to compensate for the low shear mixing. Conversely, if the nozzle employed produces a relatively high degree of shear, the total quantity of Xanthomonas hydrophilic colloid and locust bean gum can be reduced.

As an example of my method of applying an agricultural chemical, such as a herbicide to plant life, I may disperse or dissolve *Xanthomonas campestris* hydrophilic colloid in admixture with locust bean gum in water at a total concentration of ½ to 1% by weight although much lower levels are often usable. To this solution or dispersion so produced I may add 1% of the soluble dimethylamine salt of 2,4-dichlorophenoxyacetic acid, a well known herbicide. The water soluble *Xanthomonas campestris* hydrophilic colloid-locust bean gum, herbicide solution so produced, while considerably thicker than water, is easily pumpable with equipment used in the commercial application of herbicides.

The aqueous solutions or dispersions of the soluble dimethylamine salt of 2,4-dichlorophenoxyacetic acid may be formed, as indicated above, by adding all of the ingredients to water to form a single solution or dispersion containing the herbicide, the Xanthomonas hydrophilic colloid and locust bean gum. Conversely, an effective herbicidal solution or dispersion may be formed by mixing a Xanthomonas hydrophilic colloid with water to form one mixture or solution, mixing locust bean gum and water to form another mixture or solution, adding the soluble dimethylamine salt of 2,4-dichlorophenoxyacetic acid to either or both of these solutions, and mixing the two solutions in a high shear nozzle immediately prior to spraying the herbicide onto the weeds.

In the foregoing example of applying an agricultural chemical I have made reference to applying a herbicide to plant life. The surprising effectiveness of my method for this purpose also pertains to using agricultural chemicals in aqueous solutions, suspensions, or emulsions as sprays for animals, insect control, and the like.

My method may be used in applying treating materials by both surface and airborne equipment.

It will be noted in using the invention of my method in applying agricultural chemicals that the solutions, suspensions and/or emulsions initially prepared in accordance therewith may be relatively viscous as measured on a Brookfield Viscometer or similar instrument. Surprisingly, however, when subjected to pump pressure and the like they have a fluidity approaching a low viscosity material. Further, on leaving the ejection nozzles these materials markedly increase in viscosity to a semi-gelatinous character that confines the stream to the area intended to be treated even under adverse conditions.

Due to its semi-gelatinous character the agricultural chemical clings to the leaves, stems, etc. on which it is sprayed. It does not have the tendency to run off, which characterizes simple aqueous solutions of agricultural chemicals. Thus, its effectiveness is increased due to its increased contact with the vegetation and the like onto which it is sprayed.

The practical significance of my method is that agricultural chemicals utilizing aqueous carriers can be prepared conveniently, transferred readily, pumped and sprayed easily. Still further, a spray thereof will resist wind drift, coat the intended surface thoroughly, maintain said coating tenaciously and thereby make an effective and extensive application of the active ingredients on the desired surface without waste due to draining or damage due to drift to surrounding areas.

These treating materials to which my invention is applicable are sold as solids in crystal and powder form and as liquids. It will be appreciated by those skilled in the art that in preparing the aqueous admixture of a water soluble Xanthomonas hydrophilic colloid, locust bean gum, and a treating material in order to provide a relatively uniform admixture it may be necessary or desirable to use known stabilizers, sequestering and/or emulsifying agents in said treating material admixture.

In the aforementioned example of my invention employing a Xanthomonas hydrophilic colloid, I referred to such a colloid produced by the bacterium *Xanthomonas capestris*. This colloidal material is a polymer containing mannose, glucose, potassium glucuronate and acetyl radicals. In such a colloid, the potassium portion can be replaced by several other cations without substantial change in the property of the said material for my purpose. The said colloid, which is a high molecular weight, exocellular material, may be prepared by the bacterium *Xanthomonas campestris*, by whole culture fermentation of a medium containing 2–5 percent commercial glucose, organic nitrogen source, dipotassium hydrogen phosphate and appropriate trace elements. The incubation time is approximately 96 hours at 28° C., areobic conditions. In preparing the colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of large volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparation of *Xanthomonas campestris* hydrophilic colloid, a loopful of organism from the agar slant is adequate for the first stage comprising 200 milliliters of the said glucose media. In the second stage the material resulting from the first stage may be used together with 9 times its volume of a 3% glucose media. In the final stage the material produced in the second stage may be admixed with 19 times its volume of the final media. A good final media may contain 3% glucose, 0.5% distillers' dry solubles, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. The resulting *Xanthomonas campestris* colloidal material which I have found to be particularly suitable for my purpose can be recovered by precipitation in methanol of the clarified mixture from the fermentation. This resulting material may also be designated as a pseudoplastic, heteropolysaccharide hydrophilic colloid or gum produced by the bacterium species *Xanthomonas campestris*.

Additional Xanthomonas colloidal material may be prepared by repeating the procedure used for producing the *Xanthomonas campestris* colloidal material described above by substituting known Xanthomonas bacterium or organisms, i.e., *Xanthomonas carotate, Xanthomonas incanae, Xanthomonas begoniae, Xanthomonas malvacerum, Xanthomonas vesicatoria, Xanthomonas papavericola, Xanthomonas translucens, Xanthomonas vasculorum* and *Xanthomonas hederae* for the bacterium, *Xanthomonas campestris*.

In addition to the Xanthomonas hydrophilic colloids prepared by the method shown previously with regard to the bacterium *Xanthomonas campestris*, I sometimes prefer to use Xanthomonas hydrophilic colloids which are prepared by a slightly different method. In the alternative method, the colloidal material is not recovered by precipitation as, for example, in methanol. Rather, the clarified mix resulting from the final fermentation step of the process is dried by the application of heat. To illustrate, the hydrophilic colloidal material can be separated by passing the clarified mixture from the fermentation to a drum dryer which is heated with steam at 40 p.s.i. The dried film on the drum surface is thereafter removed with a sharp knife or doctor blade.

A number of alternative drying methods may be employed in separating the hydrophilic colloidal material which is employed in my invention. Thus, for example, the hydrophilic colloidal material may be separated by subjecting the clarified mixture from the fermentation to spray drying, etc.

To illustrate the wide range of ratios over which a Xanthomonas hydrophilic colloid and locust bean gum give a synergistic increase in viscosity, a number of aqueous solutions were formulated which contained varying ratios of a Xanthomonas hydrophilic colloid and locust bean gum. The Xanthomonas hydrophilic colloid employed in these tests was formed by the bacterium *Xanthomonas campestris* according to the method described previously with the colloid being separated by drying the clarified mixture resulting from the final fermentation step using a drum dryer which was heated with stream at 40 p.s.i. The dried colloidal material was removed from the surface of the drum with a sharp knife or doctor blade.

In Table I which follows, the total content of the *Xanthomonas campestris* hydrophilic colloid and locust bean gum employed in each test run was 1% by weight of the total solution. The materials were dry blended and then added to distilled water and stirred for 15 minutes with a disc type stirrer rotating at 900 r.p.m. The disc stirrer comprised a 1¾ in. diameter disc divided into four radial lobes. The lobes were bent from the plane of the disc such that the leading edges of each of the lobes were approximately ⅛ in. below the plane of the disc and the trialing edges of each of the lobes were approximately ⅛ in. above the plane of the disc. Following the stirring, the viscosity was immediately recorded with a Brookfield Viscometer, Model LVF, using a spindle rotating at 60 r.p.m.

TABLE I

| Parts of *Xanthomonas campestris* colloid | Parts of locust bean gum | Viscosity of solution (cps.) |
|---|---|---|
| 100 | 0 | 470 |
| 95 | 5 | 660 |
| 90 | 10 | 770 |
| 80 | 20 | 1,030 |
| 70 | 30 | 1,260 |
| 60 | 40 | 1,510 |
| 50 | 50 | 1,690 |
| 40 | 60 | 1,860 |
| 30 | 70 | 1,420 |
| 20 | 80 | 1,030 |
| 10 | 90 | 600 |
| 5 | 95 | 360 |
| 0 | 100 | 36 |

As shown in Table I, a wide range of mixtures of a Xanthomonas hydrophilic colloid with locust bean gum gave a synergistic increase in viscosity. A synergistic increase in viscosity was obtained at weight ratios ranging from 95 parts of a Xanthomonas hydrophilic colloid with 5 parts of locust bean gum to 5 parts of a Xanthomonas hydrophilic colloid with 95 parts of locust bean gum. The greatest viscosity increase was observed at weight ratios of 80:20 to 20:80 and the optimum viscosity increase was observed using approximately 60 parts of locust bean gum for each 40 parts of a Xanthomonas hydrophilic colloid.

The test series set forth in Table I was repeated using the same ingredients and weight ratios and employing higher shear agitation. In this instance, the dry blended materials were added to distilled water which was mixed in a Waring Blendor at high speed for 2 minutes. The results are shown in Table II.

TABLE II

| Parts of *Xanthomonas campestris* colloid | Parts of locust bean gum | Viscosity of solution (cps.) |
|---|---|---|
| 100 | 0 | 610 |
| 95 | 5 | 820 |
| 90 | 10 | 1,090 |
| 80 | 20 | 2,850 |
| 70 | 30 | 3,300 |
| 60 | 40 | 4,150 |
| 50 | 50 | 4,500 |
| 40 | 60 | 4,750 |
| 30 | 70 | 4,400 |
| 20 | 80 | 3,600 |
| 10 | 90 | 2,200 |
| 5 | 95 | 1,180 |
| 0 | 100 | 61 |

As shown in Table II, the viscosity increase obtained is dependent upon the amount of shear employed in the agitation. It should be noted, however, that the greatest viscosity improvement occurred at weight ratios of 80:20 to 20:80 as observed in Table I and that the optimum viscosity improvement was observed at a weight ratio of approximately 60 parts of locust bean gum to 40 parts of a Xanthomonas hydrophilic colloid.

To demonstrate the synergistic viscosity increase obtained through mixing locust bean gum with a Xanthomonas hydrophilic colloid, a further series of tests were carried out. In these tests, a wide variety of Xanthomonas hydrophilic colloids were separately added to water and agitated at high shear in a Waring Blendor for 30 seconds. The viscosity determinations were then immediately made by a Brookfield Viscometer, Model LVF, using a spindle speed of 30 r.p.m. The particle size of the Xanthomonas hydrophilic colloids employed and the locust bean gum were such that 100% of the material passed through a 100-mesh screen. The results of these tests are set forth in the following Table III.

TABLE III

| Concentration of Xanthomonas hydrophilic colloid | Concentration of locust bean gum, percent | Viscosity of solution (cps.) |
|---|---|---|
| 1.0% *Xanthomonas campestris* | 1.0 | 1,800 |
| 0.5% *Xanthomonas campestris* | 0.5 | 20 |
| 1.0% *Xanthomonas malvacearum* XM13 | | 2,800 |
| 0.5% *Xanthomonas malvacearum* XM13 | 0.5 | 1,280 |
| 1.0% *Xanthomonas malvacearum* R2 | | 3,800 |
| 0.5% *Xanthomonas malvacearum* R2 | 0.5 | 1,760 |
| 1.0% *Xanthomonas begoniae* S9 | | 6,400 |
| 0.5% *Xanthomonas begoniae* S9 | 0.5 | 1,560 |
| 1.0% *Xanthomonas begoniae* S3 | | 5,600 |
| 0.5% *Xanthomonas begoniae* S3 | 0.5 | 500 |
| 1.0% *Xanthomonas phaseoli* | | 3,800 |
| 0.5% *Xanthomonas phaseoli* | 0.5 | 20 |
| 1.0% *Xanthomonas carotae* XCII | | 2,000 |
| 0.5% *Xanthomonas carotae* XCII | 0.5 | 1,000 |
| 1.0% *Xanthomonas incanae* | | 4,000 |
| 0.5% *Xanthomonas incanae* | 0.5 | 1,800 |
| | | 7,000 |

As shown in Table III, a wide variety of Xanthomonas hydrophilic colloids were found to produce a synergistic increase in the viscosity of an aqueous solution when added thereto in admixture with locust bean gum. The various Xanthomonas hydrophilic colloids indicated in the table were produced in the manner set forth previously for a *Xanthomonas campestris* hydrophilic colloid with the exception that a different strain of bacterium was employed in the process, the strain of bacterium being indicated in Table III.

In order to demonstrate the surprising nature of my invention, still further tests were performed which relate to the viscosity of aqueous solutions containing various concentrations of a *Xanthomonas campestris* hydrophilic colloid, locust bean gum, or a mixture of a Xanthomonas hydrophilic colloid and locust bean gum. In these tests, solutions were prepared by adding the Xanthomonas hydrophilic colloid, locust bean gum, or a mixture of Xanthomonas hydrophilic colloid and locust bean gum to distilled water and then stirring for 15 minutes with a disc type stirrer rotating at a speed of 900 r.p.m. The disc stirrer comprised a 1¾ inch diameter disc divided into four radial lobes. The lobes were bent from the plane of the disc such that the leading edge of each of the lobes was approximately ⅛ inch below the plane of the disc and the trailing edge of each of the lobes was approximately ⅛ inch above the plane of the disc. Following the period of stirring, the viscosities of each of the solutions was immediately measured using a Brookfield Viscometer, Model LVF, employing a spindle rotating at a speed of 60 r.p.m. The viscosities of the solutions measured at room temperature are set forth in following Table IV.

TABLE IV

| Concentration, percent | Xanthomonas campestris hydrophilic colloid, 100%, cps. | Locust bean gum, 100%, cps. | 40% Xanthomonas campestris hydrophilic colloid–60% locust bean gum, cps |
|---|---|---|---|
| 0.10 | 10 | 3.5 | 47 |
| 0.25 | 35 | 6.0 | 300 |
| 0.50 | 120 | 11.0 | 840 |
| 0.75 | 234 | 22.0 | 1,200 |
| 1.00 | 384 | 58.0 | 2,050 |

As shown in the above table, the use of a *Xanthomonas campestris* hydrophilic colloid and locust bean gum was, in each case, found to produce a synergistic viscosity increase in the aqueous solution as compared with the viscosity increase obtained by the use of either a *Xanthomonas campestris* hydrophilic colloid or locust bean gum at the same concentration in the aqueous solution. This was true at all the concentrations tested, which ranged from 0.10% to 1.0 percent by weight of the solution.

In further tests, the results of which are presented in the following Table V, solutions were prepared by adding through-100 mesh Xanthomonas hydrophilic colloid, locust bean gum, or a mixture of a Xanthomonas hydrophilic colloid with locust bean gum to distilled water in a Waring Blendor and thereafter mixing at high speed for 30 seconds. Viscosity measurements were taken within a 1-minute period after mixing using a Brookfield Viscometer, Model LVT, using a UL adapter. All of the readings were taken at a rotating speed of 60 r.p.m. In all of the readings, the viscosity of water was substracted from the reported reading so as to indicate the increase in the viscosity which resulted from addition of the additive. The viscosity of distilled water at 60 r.p.m. as read by the Brookfield Viscometer, Model LVT, using a UL adapter, is 1.10 centipoises.

TABLE V

| | 0.10%, cps. | 0.005%, cps. | 0.095%, cps. |
|---|---|---|---|
| Technical *Xanthomonas campestris* | 3.52 | 0.22 | 3.11 |
| Locust bean gum (LBG) | 0.47 | 0.06 | 0.21 |
| 5% tech. *Xanthomonas campestris*–95% LBG | 0.76 | | |
| 95% tech. *Xanthomonas campestris*–5% LBG | 4.00 | | |
| *Xanthomonas phaseoli* | 2.36 | 0.08 | 2.08 |
| 5% *Xanthomonas phaseoli*–95% LBG | 0.67 | | |
| 95% *Xanthomonas phaseoli*–5% LBG | 2.68 | | |
| *Xanthomonas begoniae* S9 | 6.92 | 0.15 | 6.50 |
| 5% *Xanthomonas begoniae* S9–95% LBG | 1.38 | | |
| 95% *Xanthomonas begoniae* S9–5% LBG | 7.19 | | |
| *Xabthomonas begoniae* S3 | 2.02 | 0.06 | 1.86 |
| 5% *Xanthomonas begoniae* S3–95% LBG | 1.00 | | |
| 95% *Xanthomonas begoniae* S3–5% LBG | 2.35 | | |
| *Xanthomonas carotae* XCII | 3.31 | 0.18 | 3.11 |
| 5% *Xanthomonas carotae* XCII–95% LBG | 0.81 | | |
| 95% *Xanthomonas carotae* XCII–5% LBG | 4.27 | | |
| *Xanthomonas incanae* | 5.48 | 0.28 | 4.93 |
| 5% *Xanthomonas incanae*–95% LBG | 0.87 | | |
| 95% *Xanthomonas incanae*–5% LBG | 5.62 | | |
| *Xanthomonas malvacearum* R2 | 7.11 | 0.51 | 6.21 |
| 5% *Xanthomonas malvacearum* R2–95% LBG | 1.09 | | |
| 95% *Xanthomonas malvacearum* R2–5% LBG | 7.51 | | |

As shown in Table V each of the Xanthomonas hydrophilic colloids was found to give a synergistic viscosity increase when employed in conjunction with locust bean gum at a total concentration of the locust bean gum and Xanthomonas hydrophilic colloid of 0.10% by weight. The viscosity of water itself is an appreciable factor in determining synergy at low concentration levels; thus, the figures in Table V show the viscosity increase in centipoises resulting from the particular additive or mixture of additives at the concentration stated in the table.

The viscosity increase obtained with a mixture of Xanthomonas hydrophilic colloid and locust bean gum at a total concentration of 0.10% is shown at weight ratios of Xanthomonas hydrophilic colloid to locust bean gum of 5:95 and 95:5. At weight ratios of Xanthomonas hydrophilic colloid to locust bean gum of 5:95 the expected viscosity increase would be equal to the viscosity increase resulting from a Xanthomonas hydrophilic colloid at a concentration of 0.005% plus the viscosity increase achieved by locust bean gum at a concentration of 0.095%. As shown in the table, however, the viscosity increase obtained by using a 5:95 weight ratio of Xanthomonas hydrophilic colloid to locust bean gum at a total concentration of 0.10% was in excess of the predicated increase which would result from the additive effects of the locust bean gum and Xanthomonas hydrophilic colloid at their respective concentrations in the aqueous media.

Similarly, the expected viscosity increase obtained by using a 95:5 weight ratio of Xanthomonas hydrophilic colloid to locust bean gum at a total concentration of 0.10% would be the viscosity increase resulting from a 0.095% by weight solution of Xanthomonas hydrophilic colloid plus the viscosity increase resulting from a 0.005% solution of locust bean gum. However, as shown in Table V, the viscosity increase resulting from a 95:5 weight ratio of Xanthomonas hydrophilic colloid to locust bean gum at a total concentration of 0.10% was in excess of the predicted amount. In addition, Table V presents data showing the viscosity increase achieved by addition of 0.10% of a Xanthomonas hydrophilic colloid to water and 0.10% of locust bean gum to water.

In additional tests, data were obtained for mixtures of a Xanthomonas hydrophilic colloid with locust bean gum at weight ratios of 5:95 and 95:5 and a total concentration of 2.0% by weight. The viscosities obtained by locust bean gum and a Xanthomonas hydrophilic colloid were obtained at 0.10% by weight and at 1.90% by weight.

In obtaining the data shown in the following Table VI, solutions were prepared by adding through-100 mesh Xanthomonas hydrophilic colloid, locust bean gum and mixtures of a Xanthomonas hydrophilic colloid with locust bean gum to distilled water contained in a Waring Blendor and then mixing at high speed for 30 seconds. Viscosity measurements were taken within a 1-minute period after mixing using a Brookfield Viscometer, Model LVT with a UL adapter for the 0.10% solutions and a Brookfield Viscometer, Model LVT having a spindle speed of 30 r.p.m. for the viscosity measurements taken at 2.0% and 1.90% by weight. In these tests, the viscosity of the water was insignificant in relation to the total measured viscosities and, thus, the viscosity of water was not subtracted from the readings shown in Table VI.

TABLE VI

| | 2.00% cps. | 0.10% cps. | 1.90% cps |
|---|---|---|---|
| Technical *Xanthomonas campestris* | 2,808 | 4.62 | 2,464 |
| Locust bean gum (LBG) | 1,710 | 1.57 | 1,200 |
| 5% technical *Xanthomonas campestris*–95% LBG | 8,440 | | |
| 95% technical *Xanthomonas campestris*–5% LBG | 3,208 | | |
| *Xanthomonas phaseoli* | 2,616 | 2.46 | 2,360 |
| 5% *Xanthomonas phaseoli*–95% LBG | 8,200 | | |
| 95% *Xanthomonas phaseoli*–5% LBG | 3,800 | | |
| *Xanthomonas begoniae* S9 | 8,100 | 6.92 | 7,860 |
| 5% *Xanthomonas begoniae* S9–95% LBG | 10,900 | | |
| 95% *Xanthomonas begoniae* S9–5% LBG | 9,060 | | |
| *Xanthomonas begoniae* S3 | 3,428 | 3.12 | 2,560 |
| 5% *Xanthomonas begoniae* S3–95% LBG | 6,140 | | |
| 95% *Xanthomonas begoniae* S3–5% LBG | 4,700 | | |
| *Xanthomonas carotae* XCII | 4,600 | 4.74 | 4,100 |
| 5% *Xanthomonas carotae* XCII–95% LBG | 7,000 | | |
| 95% *Xanthomonas carotae* XCII–5% LBG | 5,080 | | |
| *Xanthomonas incanae* | 9,440 | 6.58 | 8,640 |
| 5% *Xanthomonas incanae*–95% LBG | 9,800 | | |
| 95% *Xanthomonas incanae*–5% LBG | 9,200 | | |
| *Xanthomonas malvacearum* R2 | 7,040 | 18.16 | 6,160 |
| 5% *Xanthomonas malvacearum* R2–95% LBG | 9,420 | | |
| 95% *Xanthompnas malvacearum* R2–5% LBG | 7,540 | | |

As demonstrated in Table VI, the mixtures of Xanthomonas hydrophilic colloids with locust bean gum at weight ratios of Xanthomonas hydrophilic colloid to locust bean gum of 5:95 and 95:5 each gave a viscosity which was greater than would be expected from the additive effects of the Xanthomonas hydrophilic colloid and locust bean gum. To illustrate, at a weight ratio of 5:95 of the Xanthomonas hydrophilic colloid to locust bean gum at a total concentration of 2.0%, the expected additive effect of the individual ingredients would be equal to the viscosity resulting from a 1.90% concentration of locust bean gum plus the viscosity resulting from a 0.10% concentration of Xanthomonas hydrophilic colloid. Similarly, at a weight ratio of 95:5 of Xanthomonas hydrophilic colloid to locust bean gum and a concentration of 2.0%, the expected viscosity from the additive effects of the individual components would be equal to the viscosity at a 1.90% concentration of Xanthomonas hydrophilic colloid, plus the viscosity at a 0.10% concentration of locust bean gum.

The data in Table VI further show the viscosities resulting from a Xanthomonas hydrophilic colloid at a concentration of 2.0% and the viscosity resulting from locust bean gum at a concentration of 2.0%. In one instance, the viscosity of a 2.0% solution of a Xanthomonas hydrophilic colloid was greater than the viscosity of a 95:5 weight ratio of the Xanthomonas hydrophilic colloid to locust bean gum at a concentration of 2.0%. This resulted in the case of the *Xanthomonas incanae* hydrophilic colloid. This result merely demonstrates that the viscosity curve for the *Xanthomonas incanae* colloid is quite steep between the weight concentrations of 1.90% and 2.00%. The viscosity obtained for the 95:5 mixture of *Xanthomonas incanae* hydrophilic colloid to locust bean gum at a concentration of 2.0% is, however, still considerably greater than the expected viscosity which would result from the additive effects of a 1.90% concentration of *Xanthomonas incanae* colloid plus the viscosity of a 0.10% concentration of locust bean gum. Thus, in this case also, the viscosity resulting from the 95:5 weight ratio of *Xanthomonas incanae* hydrophilic colloid to locust bean gum is greater than the additive effects of the two components.

It will be still further appreciated by those skilled in the art that there are a wide variety of agricultural chemicals and mixtures thereof and carriers or extenders therefor, to which the instant invention is applicable. In the following, I set forth examples of chemicals that might be used in accordance with my method.

EXAMPLE I: HERBICIDES dimethyl 2,3,5,6-tetrachloroterephthalate
2,2-dichloropropionic acid, sodium salt
2,4,5-trichlorophenoxyacetic acid, salts and esters thereof
2-(2,4-dichlorophenoxy) propionic acid
2,4-dichlorophenoxyacetic acid, salts and esters thereof.

EXAMPLE II: FUNGICIDES

N-trichloromethylmercapto-4-cyclohexene-1,2-dicarboximide
tetramethyl thiuram disulfide
1,2,3,4,5,6-hexachlorobenzene
disodium ethylene bisdithiocarbamate.

EXAMPLE III: INSECTICIDES 1,2,4,5,6,7,8,8-octachloro-3a,4,7,7a-tetrahydro-4,7-methanoindane
1,1,1-trichloro-2,2-bis(p-chlorophenyl)-ethane, 75% remainder largely O,P'-isomer
1,2,3,4,5,6-hexachlorocyclohexane containing at least 99% gamma isomer
O,O-diethyl s-(p-chlorophenylthiomethyl) phosphorodithioate
3-(1-methyl-2-pyrrolidyl)pyridine.

EXAMPLE IV: MITICIDES 2-(p-tert-butylphenoxy)-isopropyl 2-chloroethyl sulfite
p-chlorophenyl p-chlorobenzenesulfonate
tetraethyl pyrophosphate
O,O-diethyl s-(p-chlorophenylthiomethyl)phosphorodithioate.

EXAMPLE V: GROWTH CONTROL AGENTS tributyl 2,4-dichlorobenzylphosphonium chloride
2-(3-indole)butyric acid
1,2-dihydro-pyridazine-3,6-dione.

I claim:

1. A method of preparing a composition having improved adherence to the surfaces of plants and animals comprising admixing, in an aqueous carrier an agricultural chemical and from about 0.1% to about 2% by weight based on the weight of the carrier, of a mixture comprising a Xanthomonas hydrophyllic colloid and locust bean gum, the weight ratio of said Xanthomonas colloid to said locust bean gum ranging from 95:5 to 5.95.

2. The method of claim 1 wherein said Xanthomonas hydrophilic colloid is produced by the bacterium *Xanthomonas campestris.*

3. The method of claim 2 wherein the concentration of said mixture of Xanthomonas hydrophilic colloid and locust bean gum is about 0.2% to about 1% by weight of said aqueous carrier.

4. The method of claim 2 wherein the weight ratio of said Xanthomonas hydrophilic colloid to said locust bean gum ranges from 80:20 to 20:80.

5. The method of claim 1 wherein said Xanthomonas hydrophilic colloid is produced by the bacterium *Xanthomonas phaseoli.*

6. The method of claim 1 wherein said Xanthomonas hydrophilic colloid is produced by the bacterium *Xanthomonas begoniae.*

7. The method of claim 1 wherein said Xanthomonas hydrophilic colloid is produced by the bacterium *Xanthomonas carotae.*

8. The method of claim 1 wherein said Xanthomonas hydrophilic colloid is produced by the bacterium *Xanthomonas incanae.*

9. The method of claim 1 wherein said Xanthomonas hydrophilic colloid is produced by the bacterium *Xanthomonas malvacearum.*

10. A composition comprising an agricultural chemical, an aqueous carrier for said chemical, and from about 0.10% to about 2% by weight of the aqueous component of said carrier of a mixture of a Xanthomonas hydrophilic colloid and locust bean gum with the weight ratio of said Xanthomonas hydrophilic colloid to said locust bean gum ranging from 95:5 to 5:95.

11. The composition of claim 10 wherein the Xanthomonas hydrophilic colloid is produced by the bacterium *Xanthomonas campestris.*

12. The composition of claim 11 wherein the total concentration of Xanthomonas hydrophilic colloid and locust bean gum is about 0.2% to about 1% by weight of the aqueous component of said carrier.

13. The composition of claim 11 wherein the total concentration of said Xanthomonas hydrophilic colloid and said locust bean gum is about 0.80% by weight of said aqueous carrier.

14. The composition of claim 10 wherein said Xanthomonas hydrophilic colloid is produced by the bacterium *Xanthomonas phaseoli.*

15. The composition of claim 14 wherein the total concentration of said Xanthomonas hydrophilic colloid and said locust bean gum is about 0.2% to about 1% by weight of said aqueous carrier.

16. The composition of claim 10 wherein said Xanthomonas hydrophilic colloid is produced by the bacterium *Xanthomonas begoniae.*

17. The composition of claim 16 wherein the total concentration of said Xanthomonas hydrophilic colloid and said locust bean gum is about 0.2% to about 1% by weight of said aqueous carrier.

18. The composition of claim 10 wherein said Xanthomonas hydrophilic colloid is produced by the bacterium *Xanthomonas carotae*.

19. The composition of claim 18 wherein the total concentration of said Xanthomonas hydrophilic colloid and said locust bean gum is about 0.2% to about 1% by weight of said aqueous carrier.

20. The composition of claim 10 wherein said Xanthomonas hydrophilic colloid is produced by the bacterium *Xanthomonas incanae*.

21. The composition of claim 20 wherein the total concentration of said Xanthomonas hydrophilic colloid and said locust bean gum is about 0.2% to about 1% by weight of said aqueous carrier.

22. The composition of claim 10 wherein said Xanthomonas hydrophilic colloid is produced by the bacterium *Xanthomonas malvacearum*.

23. The composition of claim 22 wherein the total concentration of said Xanthomonas hydrophilic colloid and said locut bean gum is about 0.2% to about 1% weight of said aqueous carrier.

24. A method of applying an agricultural chemical composition to plant life, said composition comprising an admixture of an agricultural plant treating chemical, water, and from about 0.10% to about 2.0% of the aqueous component of a mixture comprising a Xanthomonas hydrophilic colloid and locust bean gum, with the weight ratio of said Xanthomonas hydrophilic colloid to said locust bean gum ranging from 95:5 to 5:95, said method comprising applying said composition to plant life by spraying said composition onto plant life through a high shear nozzle, whereby the composition is increased in viscosity to a semi-gelatinous state.

25. The method of claim 24 wherein the weight ratio of said Xanthomonas hydrophilic colloid to said locust bean gum ranges from 80:20 to 20:80.

26. A method of applying an agricultural chemical composition to pests on animals, said composition comprising an admixture of an animal pest treating material, water, and from about 0.10% to about 2.0% by weight of said water of a mixture of a Xanthomonas hydrophilic colloid and locust bean gum with the weight ratio of said Xanthomonas hydrophilic colloid to said locust bean gum ranging from 95:5 to 5:95, said method comprising applying said composition to animals by spraying said composition onto said animals through a high shear nozzle, whereby the viscosity of the composition is increased to a semi-gelatinous state.

27. The method of claim 26 wherein the weight ratio of said Xanthomonas colloid to said locust bean gum ranges from 80:20 to 20:80.

28. A method of applying agricultural chemicals to plant life comprising simultaneously combining and applying a first mixture of locust bean gum and water and a second mixture of a Xanthomonas hydrophilic colloid in water, an agricultural chemical being present in either or both of said first and second mixtures, and said mixture being combined and applied by spraying them through a high shear nozzle onto plant life, whereby the resultant viscosity of the combined mixture is increased to produce a semi-gelatinous material which clings to said plant life, the weight ratio of said Xanthomonas hydrophilic colloid to said locust bean gum in the resultant mixture ranging from 95:5 to 5:95 and the total concentration of said Xanthomonas hydrophilic colloid and said locust bean gum in the resultant mixture ranging from about 0.10% to about 2.0% by weight of said water.

29. A method of applying agricultural chemicals to pests on animals, comprising: simultaneously combining and applying a first mixture of locust bean gum and water and a second mixture of a Xanthomonas hydrophilic colloid and water, an agricultural chemical being present in either or both of said first and second mixtures, said mixtures being combined and applied by spraying them through a high shear nozzle onto pests on animals, whereby the resultant viscosity of the combined mixture is increased to produce a semi-gelatinous material which clings to said animals, the weight ratio of said Xanthomonas hydrophilic colloid to said locust bean gum in the resultant mixture ranging from 95:5 to 5:95 and the total concentration of said Xanthomonas hydrophilic colloid and said locust bean gum in the resultant mixture ranging from about 0.10% to about 2.0% by weight of said water.

References Cited
UNITED STATES PATENTS

| | | | |
|---|---|---|---|
| 3,507,664 | 4/1970 | Schuppner, Jr. | 99—139 |
| 3,519,434 | 7/1970 | Schuppner, Jr. | 99—107 |

STANLEY J. FRIEDMAN, Primary Examiner

V. D. TURNER, Assistant Examiner

U.S. Cl. X.R.

424—363

PO-1050
(5/69)

UNITED STATES PATENT OFFICE
CERTIFICATE OF CORRECTION

Patent No. 3,659,026          Dated April 25, 1972

Inventor(s)     Harry R. Schuppner, Jr.

It is certified that error appears in the above-identified patent and that said Letters Patent are hereby corrected as shown below:

Page 1, line 6   "Kelso Company" should be --Kelco Company--.

Signed and sealed this 3rd day of April 1973.

(SEAL)
Attest:

EDWARD M. FLETCHER, JR.            ROBERT GOTTSCHALK
Attesting Officer                  Commissioner of Patents